(12) United States Patent
Paul et al.

(10) Patent No.: US 10,862,360 B2
(45) Date of Patent: Dec. 8, 2020

(54) ROTOR SEGMENT OF AN ELECTRIC MACHINE

(71) Applicants: THYSSENKRUPP PRESTA TECCENTER AG, Eschen (LI); thyssenkrupp AG, Essen (DE)

(72) Inventors: Daniel Paul, Burkhardtsdorf (DE); Jürgen Meusel, Dittmannsdorf (DE)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 124 days.

(21) Appl. No.: 16/085,635

(22) PCT Filed: Mar. 20, 2017

(86) PCT No.: PCT/EP2017/056485
§ 371 (c)(1),
(2) Date: Sep. 17, 2018

(87) PCT Pub. No.: WO2017/162546
PCT Pub. Date: Sep. 28, 2017

(65) Prior Publication Data
US 2019/0103778 A1   Apr. 4, 2019

(30) Foreign Application Priority Data
Mar. 23, 2016   (DE) .......................... 10 2016 204 794

(51) Int. Cl.
*H02K 1/32* (2006.01)
*H02K 9/12* (2006.01)
*H02K 9/19* (2006.01)

(52) U.S. Cl.
CPC ................. *H02K 1/32* (2013.01); *H02K 9/12* (2013.01); *H02K 9/19* (2013.01)

(58) Field of Classification Search
CPC ............... H02K 1/32; H02K 9/12; H02K 9/19
(Continued)

(56) References Cited

U.S. PATENT DOCUMENTS

2002/0195887 A1* 12/2002 Kobayashi ............... H02K 1/32
                                                                  310/61
2009/0184592 A1*  7/2009 Sano ........................ H02K 9/19
                                                                  310/59
(Continued)

FOREIGN PATENT DOCUMENTS

CN          102714438 A      10/2012
CN          204721187 U      10/2015
(Continued)

OTHER PUBLICATIONS

English Translation of International Search Report issued in PCT/EP2017/056485, dated May 23, 2017 (dated Jul. 18, 2017).

*Primary Examiner* — Forrest M Phillips
(74) *Attorney, Agent, or Firm* — thyssenkrupp North America, LLC (57) ABSTRACT

A rotor segment of an electric machine may include a rotor shaft and a laminated core, which is arranged on the rotor shaft in such a way that a gap dimensioned sufficiently large in the radial direction for the passage of a cooling medium is produced between an outer surface of a hollow cylinder shell and an inner surface of the laminated core. The rotor segment may further include two pressure elements that are held on the rotor shaft in a stationary manner such that the pressure elements axially clamp the laminated core. Further, at least one of the pressure elements is designed as a holding segment allowing cooling medium to pass through.

14 Claims, 5 Drawing Sheets

(58) Field of Classification Search
USPC .......................................................... 310/61
See application file for complete search history.

(56) References Cited

U.S. PATENT DOCUMENTS

| | | | | |
|---|---|---|---|---|
| 2013/0009496 | A1* | 1/2013 | Maki-Ontto | H02K 9/10 |
| | | | | 310/59 |
| 2014/0333163 | A1* | 11/2014 | Horii | H02K 1/20 |
| | | | | 310/59 |
| 2015/0180313 | A1* | 6/2015 | Hayashi | H02K 1/32 |
| | | | | 310/54 |
| 2016/0261158 | A1* | 9/2016 | Horii | H02K 1/32 |
| 2017/0033632 | A1* | 2/2017 | Nagayasu | H02K 1/32 |

FOREIGN PATENT DOCUMENTS

| | | | |
|---|---|---|---|
| DE | 2523246 | A | 12/1976 |
| DE | 69004834 | T | 4/1994 |
| DE | 102009050991 | A | 5/2011 |
| DE | 102010063973 | A | 6/2012 |
| DE | 102012220239 | A | 5/2014 |
| DE | 102013200450 | A | 7/2014 |
| DE | 102014106455 | A | 11/2015 |
| EP | 195396 | A | 9/1986 |
| FR | 1350043 | A | 1/1964 |
| JP | S56139367 | U | 10/1981 |
| JP | 200625545 | A | 1/2006 |
| JP | 2008219960 | A | 9/2008 |
| JP | 2011097784 | A | 5/2011 |
| JP | 2012161134 | A | 8/2012 |
| JP | 2013115848 | A | 6/2013 |
| JP | 5772544 | B | 9/2015 |
| WO | 2014169972 | A | 10/2014 |

* cited by examiner

ROTOR SEGMENT OF AN ELECTRIC MACHINE

CROSS REFERENCE TO RELATED APPLICATIONS

This application is a U.S. National Stage Entry of International Patent Application Serial Number PCT/EP2017/056485, filed Mar. 20, 2017, which claims priority to German Patent Application No. DE 10 2016 204 794.9, filed Mar. 23, 2016, the entire contents of both of which are incorporated herein by reference.

FIELD

The present disclosure generally relates electric machines, including rotor segments for electric machines.

BACKGROUND

Basically, the design of hollow cylindrical rotor shafts for the purpose of weight reduction of rotating masses is known. It is further to be assumed as basically known that laminated cores can be fastened on the rotor shaft such that no press fit is needed radially between the shaft outer diameter and the laminated core inner diameter. In this case, the laminated core is axially compressed by means of two pressure disks, wherein friction-locking transmittal of the torque generated in the laminated cores occurs across the pressure disks and the shaft connected rotationally firmly to them to the power takeoff point, which is advantageous for the gear meshing. Thus, for example, a single-segment impeller is represented in WO 2014/169972 A1, wherein the laminated core segments in FIG. 7 are provided with flexural girders, which are inserted into radially extending slots of an end disk, so that the laminated core segments are spaced apart from the shaft, especially the rotor shaft of the electric machine. In this way, the laminated core segments do not touch the shaft either directly or indirectly across a sleeve, for example. This means that a play or a spacing is produced between the laminated core segments and the outer surface of the shaft. Based on this therefore desired radial play between the shaft outer diameter and the laminated core inner diameter, a theoretical freedom from contact accordingly exists between these components, so that stray short-circuit currents such as for example eddy currents from the metal blades to the rotor shaft or across the rotor shaft are effectively avoided. However, this freedom from contact also has the drawback that the waste heat arising on account of the electromagnetic function from the laminated cores cannot be distributed by means of corresponding thermal conduction across the rotor shaft and from this shaft across corresponding bearing points to the housing, for example, so that heat might be removed from the laminated core itself. Only the pressure disks axially clamping the laminated core serve as thermal conduction bridges for the heat arising in the laminated cores on the rotor shaft. However, these have a significantly reduced transfer surface and accordingly a reduced heat dissipation.

In order to be able to cool or remove heat from the laminated core in such an arrangement, WO 2014/169972 A1 discloses end disks with perforations, through which a coolant, in particular cold air, can be delivered into a gap between the shaft and the laminated core. In such an embodiment of an end disk provided with perforations, however, it is necessary for the laminated core itself to consist of individual laminated core segments, as indicated in the cited document, so that introduction of the coolant into the gap in the axial direction can be made possible. However, the production and arrangement of such laminated core segments requires a costly manufacturing and assembly process.

An alternative form of cooling is shown by DE 10 2010 063 973 A1. Without the providing of the play between the shaft and the laminated core as well as the configuring of individual laminated core segments inserted into the end disks, it is necessary to provide axial bore holes through the laminated core, in order to transport the coolant from the pressure disks through the laminated core. This, in turn, requires an increased machining expense for the laminated core, especially the individual plates of the laminated core, which furthermore need to be arranged relative to each other in the laminated core so that the passage of the cooling medium becomes possible.

Thus a need exists to eliminate at least some of the drawbacks in a rotor segment of an electric machine, especially an electric machine. A need also exists for a rotor segment of an electric machine, as well as an electric machine, which enables an optimal removal of heat, especially a cooling of the laminated core, in a simple and cost-effective manner, while avoiding a costly machining of the laminated core, especially the creating of any additional cooling ducts inside the laminated core.

Features and details which are described in connection with the example rotor segments may also apply to the example electric machines, and vice versa in each case, so that mutual referencing is possible in regard to the present disclosure.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The rotor segment of an electric machine according to the invention has a rotor shaft and a laminated core, which is arranged on the rotor shaft in such a way that a gap dimensioned sufficiently large in the radial direction for the passage of a cooling medium is produced between an outer surface of a hollow cylinder shell of the rotor shaft and an inner surface of the laminated core. Furthermore, the rotor segment according to the invention has two pressure elements, which are held on the rotor shaft in a stationary manner, axially clamping the laminated core, wherein at least one of the pressure elements is designed as a holding segment allowing cooling medium to pass through.

The electric machine may advantageously be a synchronous machine or an induction machine, a direct current machine or an alternating current machine. It is also conceivable to use a single-piece rotor shaft instead of a constructed rotor shaft. At least one of the flanges, advantageously both flanges, has a flange journal. The flange journals may be provided, for example, with a thread or a continuous bore. The flange journals of the two flanges advantageously serve for the mounting of the rotor shaft, especially that of the entire rotor segment, within a housing of the electric machine. For example, a thread introduced in the flange journal, especially an internal thread, can advantageously attach a shaft to the rotor shaft in a torque transmitting manner.

The laminated core, as is known, consists of individual sheet metal disks, which are axially clamped by means of the pressure elements. The pressure elements are arranged or press-fitted advantageously in torque-proof manner on the rotor shaft, especially the hollow cylinder shell of the rotor shaft and they transmit the torque generated by the laminated core to the rotor shaft. Advantageously, the gap produced between the outer diameter of the hollow cylinder shell and the inner diameter of the laminated core is not just large enough so that freedom from contact exists between laminated core and rotor shaft and consequently corresponds to a connection designed as a minimum clearance fit. Rather, the gap produced has a larger size, especially one extending quite noticeably in the radial direction.

Advantageously, in this case the height extending in the radial direction is dimensioned such that an effective convective cooling is realized. This means that the heat generated by the laminated core is taken up by means of a cooling medium flowing through the gap and transported away from the laminated cores. The cooling medium is advantageously a liquid or gaseous medium. Advantageously, the large-dimensioned gap height, far greater than a clearance fit, serves for an actual freedom from contact between the laminated core and the rotor shaft and therefore provides an electric insulation. Another benefit of this configuration is that neither the outer diameter of the rotor shaft or especially the outer diameter of the hollow cylinder shell nor the inner diameter of the laminated core needs to be fabricated with tight tolerances. Consequently, it is advantageously possible to simplify or avoid costly grinding processes on the rotor shaft, especially the hollow cylinder shell of the rotor shaft.

Likewise, the internal geometry of the punched metal sheets of the laminated core can advantageously be produced more economically on account of a more free geometry.

In order to make possible an optimally effective convection in the produced gap, a sufficiently designed flow cross section must be provided. Taking into account wall friction resistances of the flow of cooling medium in this gap, which can also be called an annular gap, and owing to other design fundamentals for a convective flow of cooling medium, a flow area of around 400-1000 mm$^2$ advantageously results. Advantageously, it is conceivable to relate the gap height being dimensioned for a sufficiently large flow cross section to the outer diameter of the rotor shaft. In this way, it is possible to take into account any possible shapes and dimensions of electric machines and thus rotor shaft geometries, which may be highly diversified. Furthermore, it is possible for the gap height to be at least 1.5-3 mm. A gap height of around 2.5 mm should be seen as being advantageous for a reference diameter of the gap of around 80 mm, consequently resulting in a flow cross section of around 600 mm$^2$. With increasing rotor shaft diameter, one must also generally expect an increasing need for heat removal, so that a ratio of around 1:8 of rotor shaft diameter to flow cross section may serve advantageously as a first design principle for a gap height of 2.5 mm.

It is possible for the rotor segment to have a constructed rotor shaft, consisting of the hollow cylinder shell as well as a first flange disposed at a first end face of the hollow cylinder shell and a second flange disposed at a second end face of the hollow cylinder shell. The hollow cylinder shell as well as the arranged flanges consequently form a rotor shaft cavity. It is likewise possible for the constructed rotor shaft to be in two pieces. In this case, the hollow cylinder shell has a flange molded onto it, which is configured for example as a substantially tapering hollow cylinder portion. A second flange is arranged at the other, nontapering end face.

According to the invention, the laminated core is axially clamped by means of two pressure elements, wherein at least one of these pressure elements is designed as a holding segment allowing cooling medium to pass through. Advantageously, the holding segment allowing cooling medium to pass through is a pressure disk with at least one axial or radial passage opening. In this case, the axial or also the radial passage opening is designed such that a flow of cooling medium from the gap through this passage opening or vice versa occurs.

It is furthermore conceivable that the holding segment allowing cooling medium to pass through consists of a pressure disk and an intermediate element to be situated between the pressure disk and the laminated core with at least one radial passage opening. In this case, the holding segment allowing cooling medium to pass through is advantageously composed of two individual components, wherein the pressure disk is advantageously a pressure disk which is basically familiar for this use and consequently commercially available. The intermediate element is advantageously configured comparable to the pressure disk, but it has a radial passage opening which interacts with the gap in a fluid transferring manner. Such a design of a holding segment allowing cooling medium to pass through is advantageously arranged on the rotor shaft such that the intermediate element is arranged between the pressure disk and an end face of the laminated core. The intermediate element is advantageously an independent component. However, it is also conceivable for the pressure disk and the intermediate element to be designed as a single-part or even a single-piece component.

It is likewise conceivable that the holding segment allowing cooling medium to pass through is a pressure disk with protrusions extending away from an end wall of the pressure disk in the axial direction and extending at least for a portion in the radial direction along the end wall. Advantageously, the holding segment comprises at least one protrusion, especially advantageously at least two or more protrusions. The protrusions are designed for example in the shape of ribs, walls, material elevations, wherein for example at least one passage opening is formed between two extending protrusions. This passage opening, which is present for example in the form of a continuous duct, is advantageously formed in an arrangement of the pressure disk on the laminated core. In this case, the axially exposed material regions of the protrusions contact an end wall or axial side wall of the laminated core, whereby the passage opening is covered or enclosed, especially formed.

Alternatively it is conceivable that the holding segment allowing cooling medium to pass through consists of a pressure disk and an intermediate element to be situated between the pressure disk and the laminated core with protrusions extending away from an end wall of the intermediate element in the axial direction and extending at least for a portion in the radial direction along the end wall. Advantageously, the intermediate element has at least one protrusion, especially advantageously at least two or more protrusions. The protrusions are designed for example in the shape of ribs, walls, material elevations, wherein for example one passage opening is formed between two extending protrusions. This passage opening, which is present for example in the form of a continuous duct, is advantageously formed in an arrangement of the holding segment allowing cooling medium to pass through on the laminated core, the intermediate element being arranged between the pressure disk and the laminated core, and the protrusions extending from an end wall of the intermediate element in the direction of the laminated core. In this case, the axially exposed material regions of the protrusions contact an end wall or axial side wall of the laminated core, whereby the at least one passage opening is covered or enclosed, especially formed.

Advantageously, the intermediate element comprises a non-ferromagnetic material. Especially advantageously, the permeability coefficient of the intermediate element is below 5, so that magnetic leakages which would reduce the efficiency of the electric machine are avoided. Consequently, the intermediate element advantageously serves for the electromagnetic shielding of parasitic magnetic flux occurring in the axial direction. The width of the intermediate piece in the axial direction, including the protrusions, is advantageously around 2-6 mm, especially advantageously around 4 mm. It is conceivable for the intermediate element to be made from a plastic material or aluminum material—at least in part. Furthermore, it is also possible to realize, regardless of the design of the radial passage openings indicated in the specification, complex passage opening geometries in order to ensure an adequate heat removal. Thanks to the use of an intermediate element, a specific material chosen for the pressure disks in regard to its ferromagnetic properties is hence irrelevant. Consequently, it is also conceivable to use pressure disks made from a steel material.

In the context of the invention it is possible the hollow cylinder shell of the rotor shaft comprises at least one radial borehole in the area of the gap. This means that a cooling medium can be brought for example from the rotor shaft cavity across this radial borehole into the gap created between the rotor shaft and the laminated core. In this case, it is possible for the radial borehole to be formed in a distal end region of the hollow cylinder shell, as viewed in the longitudinal direction, or also at its center. Advantageously, however, the radial borehole of the rotor shaft is formed at least in the region of the cylinder shell that overlaps with the gap, especially an annular gap.

It is furthermore conceivable for the hollow cylinder shell to have a plurality of radial boreholes formed in the area of the gap, spaced apart from each other by equal distances in the circumferential direction. Advantageously, each of the plurality of radial boreholes is introduced in the area of the hollow cylinder shell that overlaps the gap, especially the annular gap. It is possible in this case for the cooling medium to enter the gap, for example starting from the rotor shaft cavity, through the plurality of radial boreholes. It is likewise possible for a cooling medium flowing through the gap to enter the rotor shaft cavity via the radial boreholes and to be transported out from the rotor shaft cavity via a borehole in one of the flanges, especially in the area of the flange journal. It is furthermore possible for the plurality of radial boreholes to be formed in both end regions of the hollow cylinder shell, wherein it is also possible for the plurality of radial boreholes to be formed in the axial center of the hollow cylinder shell.

In the context of the invention it is furthermore conceivable that the radial borehole is designed to generate a flow at least in the form of a sloping hollow cylinder or has a structure on its borehole wall. Consequently, it is possible for the radial borehole or the plurality of radial boreholes to have a sloping shape, especially a slanted inner borehole wall and/or a flow-generating structure. It is likewise possible for at least one of the radial boreholes to have such a shape. Advantageously, the mentioned geometrical shape of the radial boreholes, that is, in the form of a sloping hollow cylinder and/or also by means of configuring definite structures, generates a flow of the cooling medium through the radial boreholes either from the rotor shaft cavity into the gap or out from the gap and into the rotor shaft cavity.

It is furthermore possible for at least one of the flanges of the rotor shaft to be a flange allowing medium to pass through, wherein an axial passage opening is formed off-center from the rotor shaft longitudinal axis in an end wall, that is, a wall of the flange extending substantially in the radial direction. It is also conceivable for a plurality of such axial passage openings formed off-center from the rotor shaft axis to be arranged in the end wall of this flange. In this case, it is possible for the flange allowing medium to pass through to have for example a flange journal with a thread, especially an internal thread, for the arrangement of a shaft with a corresponding external thread, for example, wherein at the same time a cooling medium is transported via the axial passage openings introduced in the end wall into the rotor shaft cavity or is transported out from this rotor shaft cavity.

It is likewise conceivable that at least one of the flanges of the rotor shaft is a flange allowing medium to pass through, wherein an axial passage opening is formed in a flange journal of the flange in the region of the rotor shaft cavity. This is advantageously an axial passage opening formed centrally to the rotor shaft longitudinal axis, which extends through the flange journal so that a cooling medium can be brought in through the flange allowing medium to pass through, especially through the flange journal of the flange allowing medium to pass through, into the rotor shaft cavity, or transported out from this.

In the context of the invention it is furthermore conceivable that at least one element conducting cooling medium is situated at least for a portion inside the rotor shaft cavity. Advantageously, this element conducting cooling medium extends through an opening, especially an axial passage opening through one of the flanges, especially through a flange conducting medium, and into the rotor shaft cavity. It is also conceivable for the element conducting cooling medium to extend through the entire rotor shaft cavity along the rotor shaft longitudinal axis. Especially advantageously, the element conducting cooling medium extends through an axial passage opening formed centrally to the rotor shaft longitudinal axis through the flange journal of a flange allowing medium to pass. Advantageously, the element conducting cooling medium has a first cross section for supplying the cooling medium to the rotor shaft cavity and a second cross section for draining the cooling medium from the rotor shaft cavity. It is furthermore possible for the element conducting cooling medium to be designed such that a uniform distribution of the cooling medium on the inner surface of the hollow cylinder shell of the rotor shaft is made possible, especially in the circumferential direction. Advantageously, the element conducting cooling medium has a funnel-shaped end piece, wherein this funnel-shaped end piece or the funnel opens into the rotor shaft cavity and tapers in the direction of the flange allowing medium to pass through. Advantageously, the tapering of the funnel is formed progressively as a tube which extends through the axial passage opening of the flange allowing medium to pass through.

There is furthermore claimed an electric machine, comprising a rotor segment of the above mentioned kind. The electric machine furthermore comprises a stator radially surrounding the rotor shaft, having a stator winding and a housing surrounding the stator, wherein the housing comprises at least one cooling duct sealed off from the outer surroundings for conducting a cooling medium to cool the electric machine. Advantageously, the cooling duct in the wall of the housing extends at least for a portion in the axial and/or radial direction opposite the rotor segment.

Thanks to the configuring of such a cooling duct, a cooling circuit is closed. Furthermore, a convective cooling of the winding heads as well as the removal of heat from the cooling medium via the cooling of the stator shell is also possible. Advantageously, moreover, no opening of the housing is required, so that the electric machine is consequently encapsulated. Thanks to a permanent circulating of air in the interior of the electric machine, it is possible to effectively cool places where much heat is produced, bringing about a temperature equalization inside the electric machine.

The electric machine according to the invention has all the benefits already described for a rotor segment according to the first aspect of the invention.

Elements with the same function and mode of operating are provided each time with the same reference number in FIGS. 1 to 9.

Figure 1:
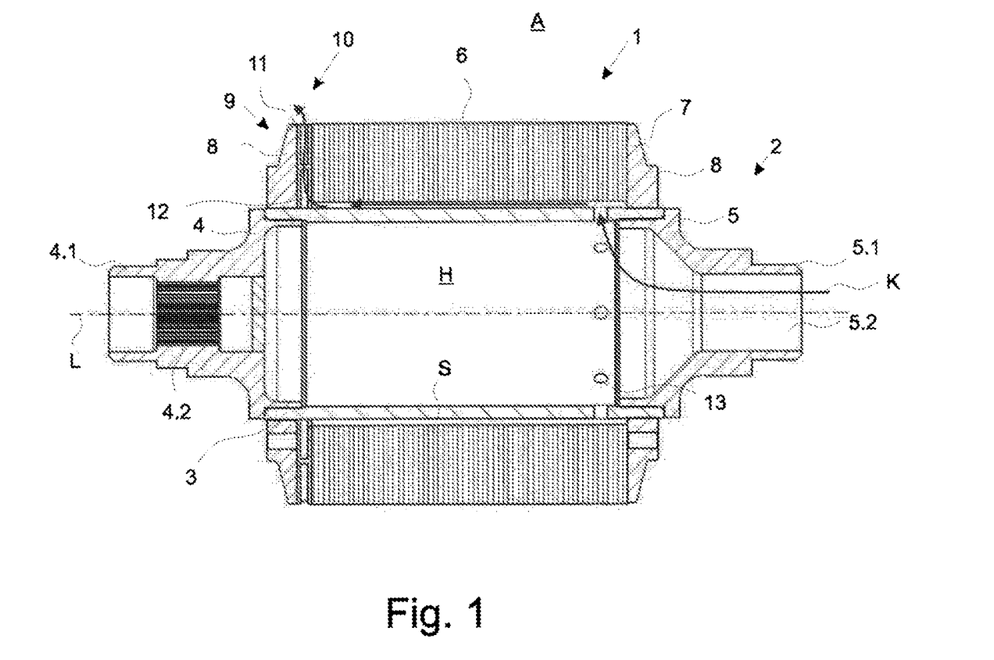
FIG. 1 is a cross-sectional view of an example rotor segment.

FIG. 1 shows schematically in a cross sectional representation one embodiment of a rotor segment 1 according to the invention. The rotor segment 1 comprises a rotor shaft 2, consisting of a hollow cylinder shell 3 as well as a first flange 4 and a second flange 5. The first flange 4 is disposed at a first end face of the hollow cylinder shell 3, while the second flange 5 is disposed at a second end face of the hollow cylinder shell 3. The first flange 4 comprises a flange journal 4.1, which extends along the rotor shaft longitudinal axis L, also called the longitudinal axis L, as well as a thread 4.2, which is advantageously configured as an internal thread. The second flange 5 comprises a flange journal 5.1, which likewise extends along the longitudinal axis L opposite the direction of extension of the flange journal 4.1 of the first flange 4. The flange journal 5.1 of the second flange 5 comprises an axial passage opening 5.2. Consequently, in the embodiment of FIG. 1, the second flange 5 is a flange allowing medium to pass through. The axial passage opening 5.2 extends from outer surroundings A of the rotor segment 1 into the rotor shaft cavity H of the rotor shaft 2, so that a cooling medium, represented by means of arrows and denoted with reference symbol K, enters through the axial passage opening 5.2 of the second flange into the rotor shaft cavity H.

The hollow cylinder shell 3 comprises at least one borehole 13, especially a radial borehole 13, advantageously a plurality of boreholes 13. The plurality of boreholes 13 are advantageously spaced apart equally from each other in the circumferential direction of the hollow cylinder shell 3 in its wall. Through the at least one borehole 13, the cooling medium K introduced into the rotor shaft cavity H flows into a gap S, which is formed between the laminated core 6 and the hollow cylinder shell 3 of the rotor shaft 2. The laminated core 6 is compressed axially by means of two pressure elements 7 and 9. The first pressure element 7 is formed in the shape of a pressure disk 8. The second pressure element 9 is in the shape of a holding segment 10 allowing cooling medium to pass through. The holding segment 10 allowing cooling medium to pass through comprises in this case a pressure disk 8 as well as an intermediate element 11. The intermediate element 11 is situated axially between the pressure disk 8 and the laminated core 6. The intermediate element 11 has a radial passage opening 12, which extends from the outer surroundings A as far as the region of the gap S. Consequently, it is possible for cooling medium K introduced into the gap S to be drained via the radial passage opening 12 of the intermediate element 11 to the outer surroundings A indicated in FIG. 1. It is furthermore also conceivable for the cooling medium flow of the cooling medium K to run in the opposite direction. In this case, it is possible for the cooling medium K, especially the cooling medium flow K coming from the outer surroundings, to be introduced via the radial passage opening 12 of the intermediate element 11 into the gap S and be transferred across the borehole 13 to the rotor shaft cavity H and then be led out once more from the rotor shaft cavity H across the axial passage opening 5.2 of the second flange 5.

Figure 2A:
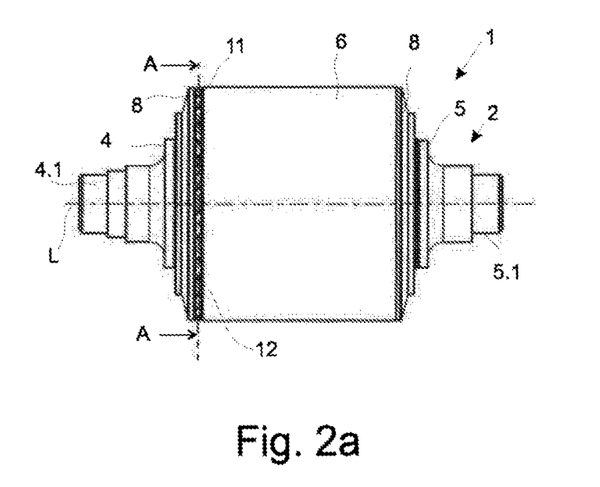
FIG. 2a is a top view of the example rotor segment of FIG. 1.
Figure 2B:
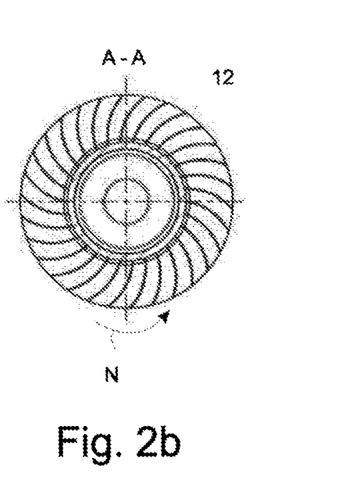
FIG. 2b is a top view of the example rotor segment of FIG. 2a taken across section A-A.

FIG. 2a shows schematically a top view of the embodiment of a rotor segment 1 according to the invention as shown in FIG. 1. In this top view there is shown in particular the configuration of the intermediate element 11 and the radial passage openings 12 introduced in the intermediate element 11, there being formed a plurality of radial passage openings 12 spaced apart from each other in the circumferential direction. This is also shown in particular in FIG. 2b, which represents a top view of section A-A of FIG. 2a. FIG. 2b shows a configuration of the radial passage openings 12, which have curved walls with a bend either in the rotary direction or against the rotary direction. The rotary direction is indicated by the reference symbol N and corresponds to the rotary direction during a rotation of the rotor shaft 2 about the longitudinal axis L. As shown in FIG. 2b, it is likewise conceivable for a plurality of radial passage openings 12 to be able to be formed in the intermediate element 11, distributed in the circumferential direction about the rotor shaft 2. Advantageously, the trend of the radial passage openings 12 is curved, looking in the radial direction, to produce a vane effect. In this way, either the cooling medium K introduced into the rotor shaft cavity H across the axial passage opening 5.1 of a flange 5 is given off to outer surroundings A across the radial passage openings 12, as shown for example in FIG. 1, or the cooling medium K present in outer surroundings A is transported across the plurality of passage openings 12 into the gap S and from there into the rotor shaft cavity H.

Figure 3A:
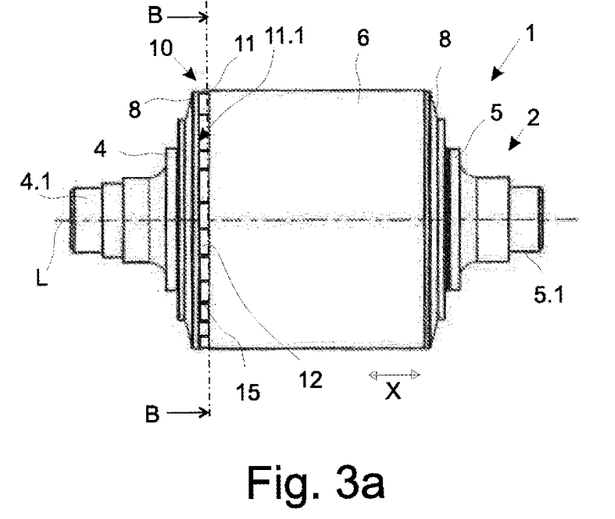
FIG. 3a is a top view of another example rotor segment.
Figure 3B:
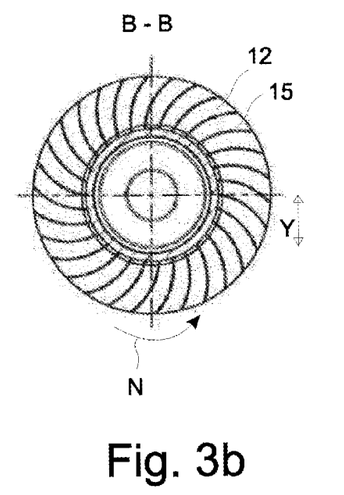
FIG. 3b is a top view of the example rotor segment of FIG. 3a taken across section B-B.

FIG. 3a shows schematically a top view of one embodiment of a rotor segment 1 according to the invention. The rotor segment 1 comprises, in addition to the laminated core 6 and the rotor shaft 2, a holding element 10 allowing cooling medium to pass through. The holding element 10 allowing cooling medium to pass through comprises for example a pressure disk 8 and an intermediate element 11 situated between the pressure disk 8 and the laminated core. The intermediate element 11 comprises a plurality of protrusions 15 extending in the axial direction X toward the laminated core 6. These protrusions 15 are advantageously formed in the shape of webs, material bulges, walls, or a comparable shape. As shown in FIG. 3b, which is a top view of the section B-B shown in FIG. 3a, it is conceivable for the protrusions 15 to run in curved form in the radial direction Y along an end wall 11.1 (see FIG. 3a) of the intermediate element 11, from which the protrusions 15 extend in the axial direction X. Between the individual protrusions 15, wherein only one protrusion with reference number 15 has been drawn in FIGS. 3a and 3b for reasons of clarity, there are formed radial passage openings 12, which are advantageously open at least toward one end in the form of through ducts, that is, they are not covered by a wall and therefore are not completely enclosed by one wall or a plurality of walls. As can be seen in FIG. 3a, the regions of the protrusions 15 lying in the axial direction X contact a side wall of the laminated core 6. This side wall of the laminated core 6 consequently covers the passage openings 12.

Figure 3C:
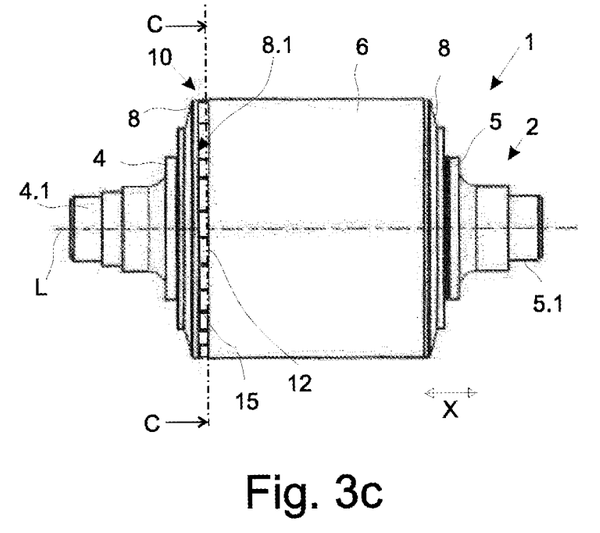
FIG. 3c is a top view of an example rotor segment.
Figure 3D:
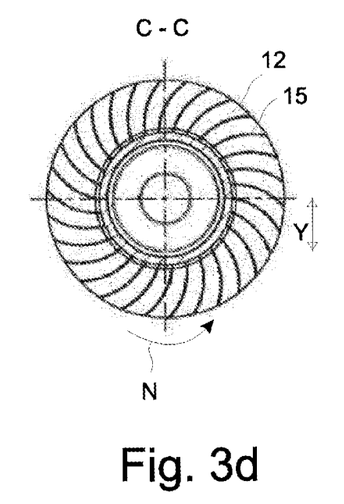
FIG. 3d is a top view of the example rotor segment of FIG. 3c taken across section C-C.

A comparable situation is shown in FIGS. 3c and 3d, but here only a pressure disk 8 is used as the holding element 10 allowing cooling medium to pass through, having a protrusion 15, advantageously a plurality of protrusions 15, which extend from one end face 8.1 of the pressure disk 8 in the axial direction X and run along this end face 8.1 in the radial direction Y, in curved or straight form. The configuration of the protrusions 15 substantially corresponds to that of the protrusions 15 in the embodiment of a rotor segment 1 according to the invention as shown in FIGS. 3a and 3b, so that reference is made to the description given there.

Figure 4:
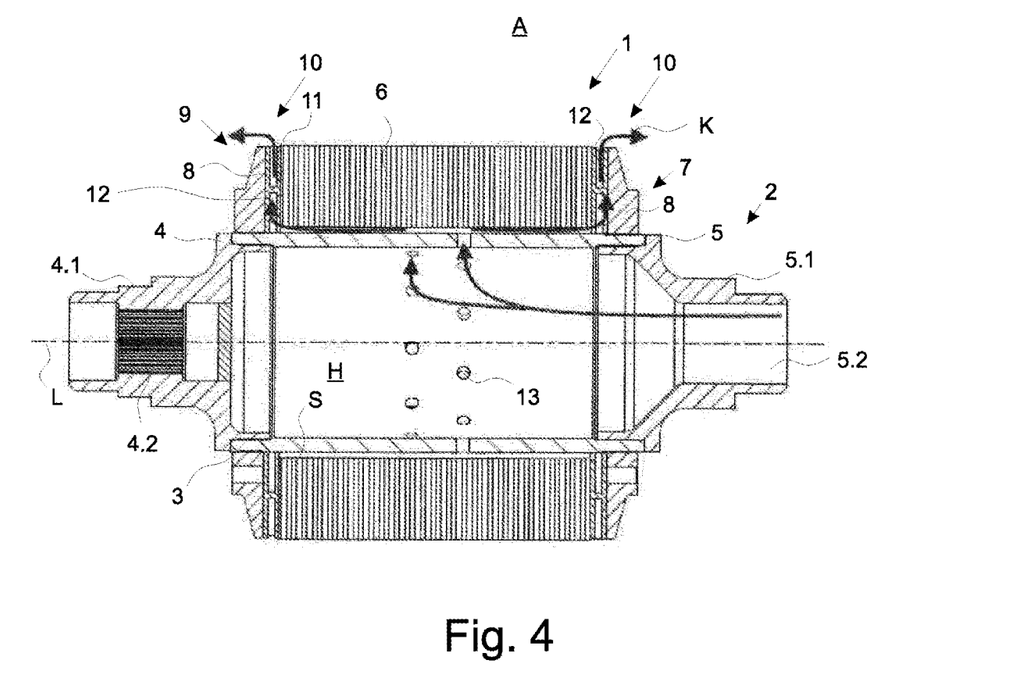
FIG. 4 is a cross-sectional view of still another example rotor segment.

FIG. 4 shows schematically in a cross sectional representation another embodiment of a rotor segment 1 according to the invention. Similar to the embodiment of a rotor segment 1 according to the invention as shown in FIG. 1, the embodiment of a rotor segment 1 according to the invention as shown in FIG. 4 also has a constructed rotor shaft 2 as well as a laminated core 6 axially compressed between two pressure elements 7 and 9. Unlike the embodiment of a rotor segment 1 according to the invention as shown in FIG. 1, the embodiment of a rotor segment 1 according to the invention as shown in FIG. 4 comprises two holding segments 10 allowing cooling medium to pass through. Both holding segments 10 allowing cooling medium to pass through each consist of a flange 8 and an intermediate element 11. The boreholes 13 introduced in the hollow cylinder shell 3 are distributed along two rows running in the circumferential direction and axially spaced apart from each other, being equally spaced apart in the circumferential direction. Advantageously, the respective boreholes 13 of the two rows are offset from each other in the circumferential direction. The cooling medium flow K introduced across the flange 5 allowing medium to pass through is consequently brought in through the axial passage opening 5.2 into the rotor shaft cavity H and from there it is transported across the plurality of boreholes 13 into the gap S, which is formed between the laminated core 6 and the hollow cylinder shell 3. Starting from here, the cooling medium flow K is given off further, across the respective intermediate elements 11 of the two holding segments 10 allowing cooling medium to pass through, to the outer surroundings A.

Figure 5:
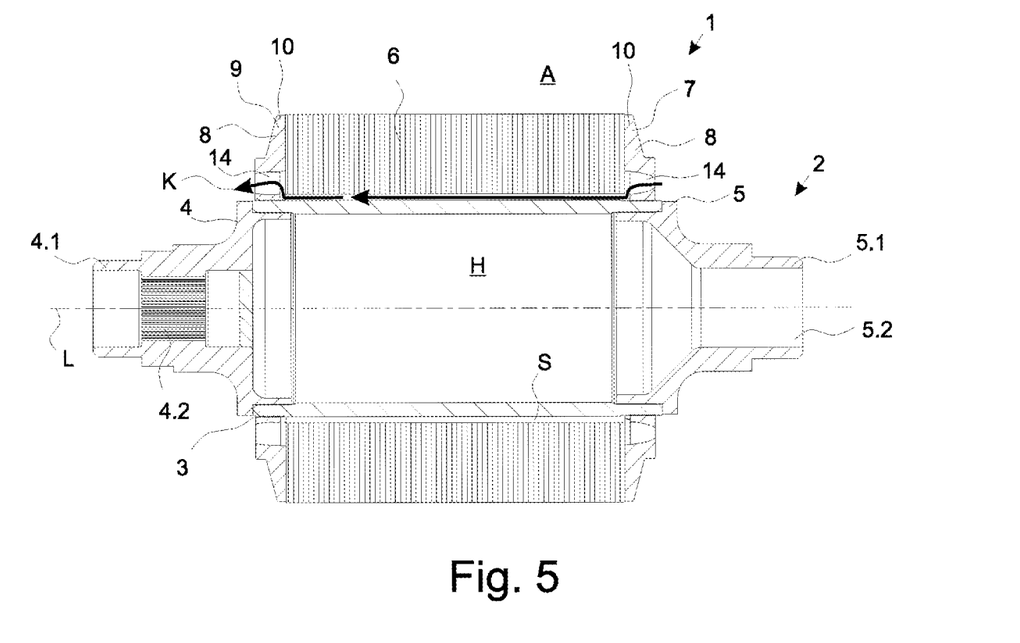
FIG. 5 is a cross-sectional view of yet another example rotor segment.

FIG. 5 shows schematically in a cross sectional representation another embodiment of a rotor segment 1 according to the invention. In departure from the embodiments of FIGS. 1 and 4, the embodiment of a rotor segment 1 according to the invention shown in FIG. 5 comprises a first pressure element 7 as well as a second pressure element 9. Both pressure elements 7 and 9 are in the form of a pressure disk 8 with at least one axial passage opening 14, wherein it is furthermore conceivable for at least one of the two pressure disks 8 to also comprise a plurality of axial passage openings 14. Advantageously, the plurality of axial passage openings are distributed at equal spacing in the circumferential direction. The respective axial passage opening 14, or the plurality of axial passage openings 14, is or are formed in a region of the pressure disk 8 in which a transfer of the cooling medium K from one axial passage opening 14 of one of the pressure disks 8 to the gap S and further to an axial passage opening 14 of the other pressure disk 8 is made possible. This means that the axial passage opening 14 or the plurality of axial passage openings 14 are formed close to the central borehole of the pressure disk, through which the rotor shaft extends, especially the hollow cylinder shell, at least for a portion in a region of the pressure disk which overlaps with the gap S.

Figure 6:
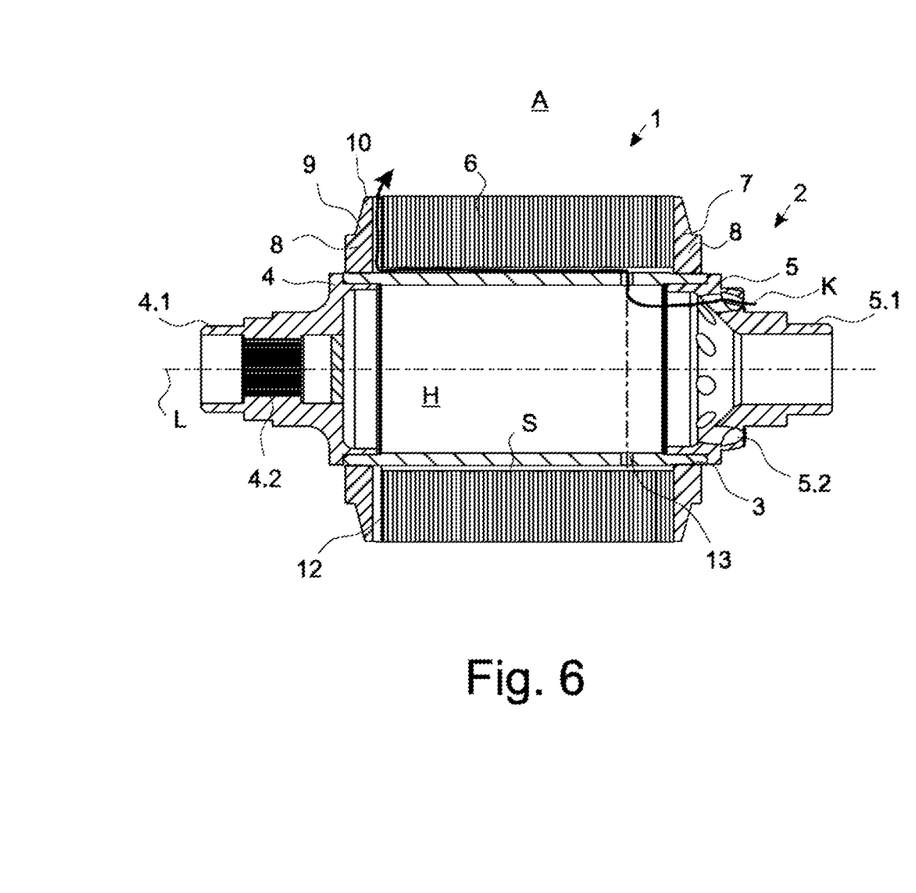
FIG. 6 is a cross-sectional view of an example rotor segment.
Figure 7:
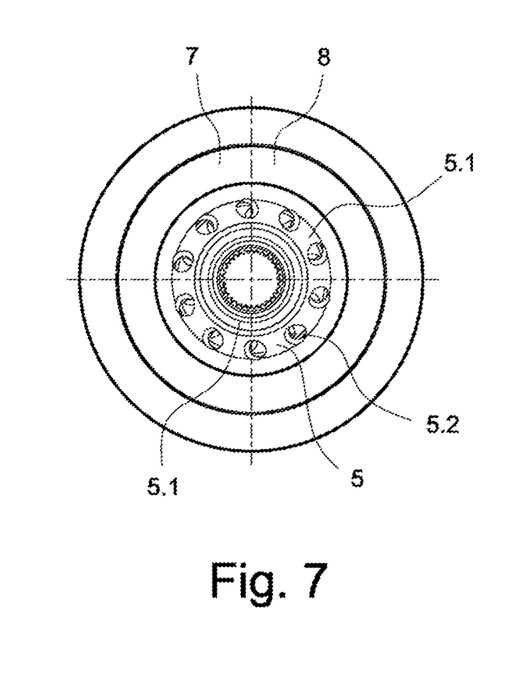
FIG. 7 is a top view of an example flange that allows medium to pass through the rotor segment shown in FIG. 6.

FIG. 6 shows schematically in a cross sectional representation another embodiment of a rotor segment 1 according to the invention. This embodiment corresponds substantially to the embodiment of a rotor segment 1 according to the invention as shown in FIG. 1, however the radial passage openings 12 are not formed, as shown in FIG. 1, in an intermediate element 11 of a holding segment 10 allowing cooling medium to pass through, but rather in the pressure disk 8 itself. This means that advantageously no further component needs to be arranged between the pressure disk 8 and the laminated core 6 in order to make possible a radial conveying of the cooling medium flow K along the laminated core 6. Furthermore, the flange 5 allowing medium to pass through comprises a plurality of axial passage openings 5.2, which are formed off-center from the rotor shaft longitudinal axis L in the wall of the flange 5. Advantageously, the axial passage openings 5.2 are spaced apart from each other in the circumferential direction and have an opening channel running at a slant substantially in the axial direction. This advantageously makes possible an aspiration of the cooling medium K from the outer surroundings A into the rotor shaft cavity H. A top view of this flange 5 allowing medium to pass through of the rotor segment 1 of FIG. 6 is shown in FIG. 7.

Figure 8:
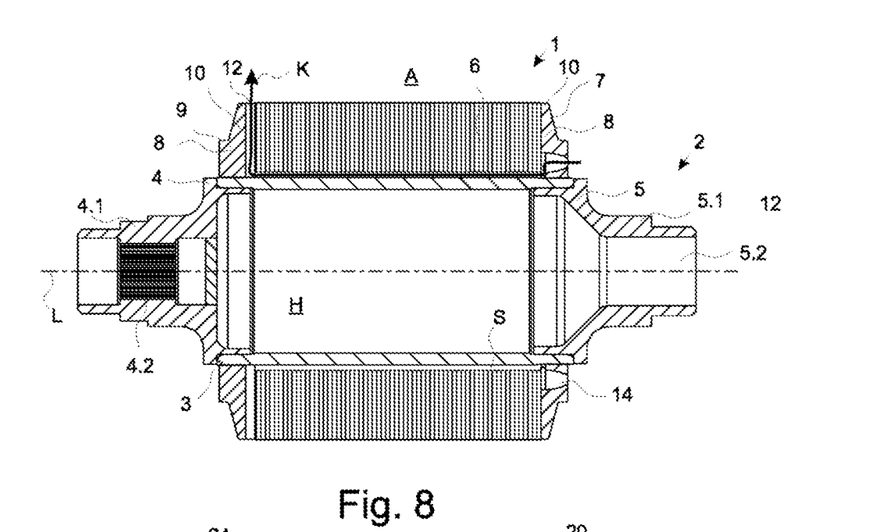
FIG. 8 is a cross-sectional view of another example rotor segment.

FIG. 8 shows another embodiment of a rotor segment 1 according to the invention. Unlike the previously shown embodiments of the rotor segment 1 according to the invention, the embodiment shown in FIG. 8 comprises a first pressure element 7, configured as a pressure disk 8 with an axial passage opening 14, and a second pressure element 9, configured as a pressure disk 8 with a radial passage opening 12. Consequently, it is possible to transport or convey the cooling medium flow K across the axial passage opening 14 through the gap S to the radial passage opening 12 or vice versa. This advantageously makes possible a removal of heat from the laminated core 6 on three sides.

Figure 9:
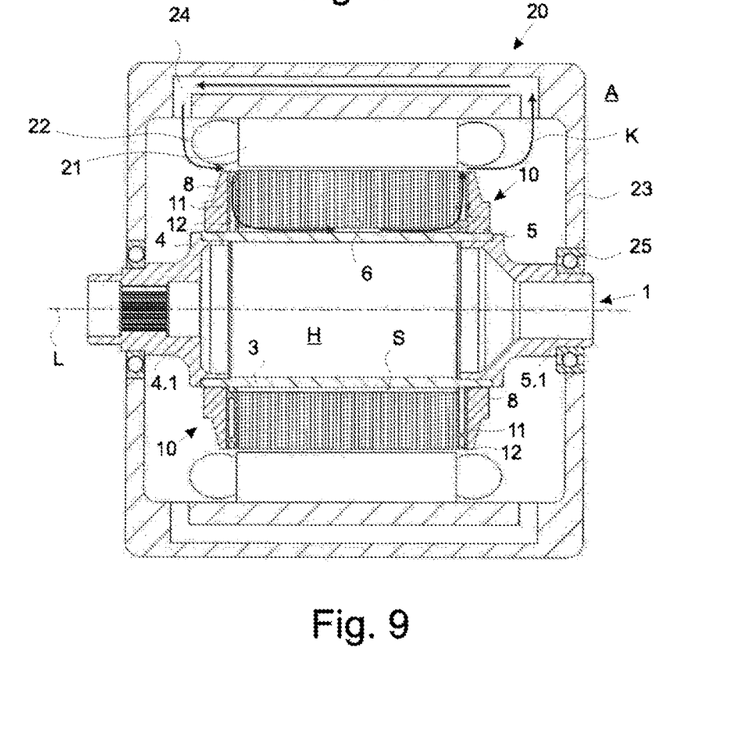
FIG. 9 is a cross-sectional view of an example electric machine.

FIG. 9 shows an embodiment of an electric machine 20 according to the invention. The electric machine 20 in addition to a rotor segment 1 also comprises a stator 21 with a starter winding 22. Surrounding the stator 21 and the rotor segment 1 is a housing 23 of the electric machine 20, in whose housing wall at least for a portion there is introduced a cooling duct 24. The cooling duct 24 extends from a housing interior I through a portion of the housing wall and once again ends in the region of the housing interior, so that the housing 23 is advantageously a closed housing 23. The rotor segment 1 arranged in the electric machine 20 of FIG. 9 substantially corresponds to the embodiment shown in FIG. 4 of a rotor segment 1 according to the invention, but the rotor segment 1 shown in FIG. 9 has no bore-holes 13 formed in the hollow cylinder shell 3. Instead, the transport of the cooling medium K occurs between the housing 23, especially the cooling duct 24 of the housing 23, and the laminated core 6. This means that a cooling circuit is created in which the cooling medium K is not led through the rotor shaft cavity H, but instead across two pressure elements 7 and 9 designed as holding segments 10 allowing cooling medium to pass through and the gap S, as well as along the cooling duct 24. The rotor segment 1 is mounted rotatably by bearings 25 inside the housing 23.

LIST OF REFERENCE NUMBERS

1 Rotor segment
2 Rotor shaft
3 Hollow cylinder shell
4 First flange
4.1 Flange journal
4.2 Thread
5 Second flange
5.1 Flange journal
5.2 Axial passage opening
6 Laminated core
7 First pressure element
8 Pressure disk
8.1 End face
9 Second pressure element
10 Holding elements allowing cooling medium to pass through
11 Intermediate elements
11.1 End face
12 Radial passage openings
13 Borehole
14 Axial passage openings
15 Protrusion
20 Electric machine
22 Stator
22 Stator winding
23 Housing
24 Cooling duct
25 Bearing
A Outer surroundings
H Rotor shaft cavity
I Housing inside
L Rotor shaft longitudinal axis/longitudinal axis
N Rotary direction
S Gap
X Axial direction
Y Radial direction

What is claimed is:

1. A rotor segment of an electric machine, the rotor segment comprising:
    a rotor shaft having a hollow cylinder shell with an outer surface;
    a laminated core disposed on the rotor shaft such that an annular gap, which is dimensioned sufficiently large in a radial direction for passage of a cooling medium, is positioned between the outer surface of the hollow cylinder shell of the rotor shaft and an inner surface of the laminated core; and
    two pressure elements that are held on the rotor shaft in a stationary manner, axially clamping the laminated core, wherein at least one of the two pressure elements is configured as a holding segment that allows the cooling medium to pass through.

2. The rotor segment of claim 1 wherein the rotor shaft is a constructed rotor shaft that comprises:
    the hollow cylinder shell;
    a first flange disposed at a first end face of the hollow cylinder shell; and
    a second flange disposed at a second end face of the hollow cylinder shell so that a rotor shaft cavity is formed.

3. The rotor segment of claim 1 wherein the holding segment is a pressure disk with an axial passage opening or a radial passage opening.

4. The rotor segment of claim 1 wherein the holding segment comprises a pressure disk and an intermediate element that is disposed between the pressure disk and the laminated core with a radial passage opening.

5. The rotor segment of claim 1 wherein the holding segment is a pressure disk with protrusions extending away from an end wall of the pressure disk in an axial direction and extending at least for a portion in the radial direction along the end wall.

6. The rotor segment of claim 1 wherein the holding segment comprises a pressure disk and an intermediate element disposed between the pressure disk and the laminated core with protrusions extending away from an end wall of the intermediate element in an axial direction and extending at least for a portion in the radial direction along the end wall.

7. The rotor segment of claim 1 wherein the hollow cylinder shell has a plurality of radial boreholes in an area of the annular gap, wherein the plurality of radial boreholes are spaced apart from each other by equal distances in a circumferential direction.

8. The rotor segment of claim 1 wherein the hollow cylinder shell of the rotor shaft comprises a radial borehole in an area of the annular gap.

9. The rotor segment of claim 8 wherein the radial borehole is configured to generate a flow at least in a form of a sloping hollow cylinder.

10. The rotor segment of claim 8 wherein a borehole wall of the radial borehole has a structure.

11. The rotor segment of claim 1 wherein the rotor shaft is a constructed rotor shaft that comprises:
    the hollow cylinder shell;
    a first flange disposed at a first end face of the hollow cylinder shell; and
    a second flange disposed at a second end face of the hollow cylinder shell so that a rotor shaft cavity is formed,
    wherein at least one of the first flange or the second flange allows the cooling medium to pass through and has an end wall with an axial passage opening disposed off-center from a rotor shaft longitudinal axis.

12. The rotor segment of claim 1 wherein the rotor shaft is a constructed rotor shaft that comprises:
the hollow cylinder shell;
a first flange disposed at a first end face of the hollow cylinder shell; and
a second flange disposed at a second end face of the hollow cylinder shell so that a rotor shaft cavity is formed,
wherein at least one of the first flange or the second flange allows the cooling medium to pass through, wherein an axial passage opening is disposed concentrically to a rotor shaft longitudinal axis in a flange journal of the at least one of the first flange or the second flange in a region of the rotor shaft cavity.

13. The rotor segment of claim 1 wherein the rotor shaft is a constructed rotor shaft that comprises:
the hollow cylinder shell;
a first flange disposed at a first end face of the hollow cylinder shell; and
a second flange disposed at a second end face of the hollow cylinder shell so that a rotor shaft cavity is formed,
wherein an element conducting cooling medium is positioned at least for a portion inside the rotor shaft cavity.

14. An electric machine comprising:
a rotor segment that includes
a rotor shaft having a hollow cylinder shell with an outer surface,
a laminated core disposed on the rotor shaft such that an annular gap, which is dimensioned sufficiently large in a radial direction for passage of a cooling medium, is positioned between the outer surface of the hollow cylinder shell of the rotor shaft and an inner surface of the laminated core, and
two pressure elements that are held on the rotor shaft in a stationary manner, axially clamping the laminated core, wherein at least one of the two pressure elements is configured as a holding segment that allows the cooling medium to pass through;
a stator radially surrounding the rotor shaft;
a stator winding; and
a housing surrounding the stator, wherein the housing comprises a cooling duct sealed off from outer surroundings for conducting the cooling medium to cool the electric machine.

* * * * *